US005516455A

United States Patent [19]
Jacobine et al.

[11] Patent Number: 5,516,455
[45] Date of Patent: May 14, 1996

[54] POLYMER DISPERSED LIQUID CRYSTALS IN RADIATION CURABLE ELECTRON-RICH ALKENE-THIOL POLYMER MIXTURES

[75] Inventors: Anthony F. Jacobine, Meriden; John G. Woods, Farmington, both of Conn.; Margaret A. Rakas, Longmeadow, Mass.

[73] Assignee: Loctite Corporation, Hartford, Conn.

[21] Appl. No.: 391,252

[22] Filed: Feb. 17, 1995

Related U.S. Application Data

[62] Division of Ser. No. 279,936, Jul. 25, 1994, abandoned, which is a continuation of Ser. No. 56,102, May 3, 1993, abandoned.

[51] Int. Cl.$^6$ .......................... C09K 19/02; C09K 19/52; C08G 75/04; C08L 81/02
[52] U.S. Cl. .......................... 252/299.01; 252/299.66; 252/299.67; 522/1; 522/180; 524/205; 524/293; 528/376; 528/360
[58] Field of Search ...................... 252/299.01, 299.66, 252/299.67; 522/1, 180; 524/205, 293; 528/376, 360

[56] References Cited

U.S. PATENT DOCUMENTS

| | | | |
|---|---|---|---|
| 2,836,603 | 5/1958 | Emerson et al. | 260/340.5 |
| 3,700,574 | 10/1972 | Kiehr | 528/376 |
| 4,304,767 | 12/1981 | Heller et al. | 424/78 |
| 4,518,788 | 5/1985 | Crivello | 560/64 |
| 4,728,547 | 3/1988 | Vaz | 428/1 |
| 4,808,638 | 2/1989 | Steinkraus | 522/24 |
| 4,864,054 | 9/1989 | Crivello et al. | 560/64 |
| 4,869,847 | 9/1989 | Leslie et al. | 252/299.01 |
| 4,891,152 | 1/1990 | Miller | 252/299.01 |
| 4,957,998 | 9/1990 | Heller et al. | 528/220 |
| 4,967,015 | 10/1990 | Karcher | 568/616 |
| 4,971,719 | 11/1990 | Vaz | 252/299.01 |
| 4,994,204 | 2/1991 | Doane et al. | 252/299.01 |
| 5,011,624 | 4/1991 | Yamagishi et al. | 252/299.5 |
| 5,013,821 | 5/1991 | Heller et al. | 528/376 |
| 5,021,188 | 6/1991 | Vaz et al. | 252/299.5 |
| 5,034,490 | 7/1991 | Jacobine | 528/30 |
| 5,045,572 | 9/1991 | Plotkin et al. | 522/31 |
| 5,070,117 | 12/1991 | Klemarczyk | 522/31 |
| 5,082,874 | 1/1992 | Liu et al. | 522/100 |
| 5,167,863 | 12/1992 | Kitamura et al. | 252/299.65 |
| 5,211,876 | 5/1993 | Vaz et al. | 252/299.1 |
| 5,225,104 | 7/1993 | Van Steenkiste | 252/299.01 |
| 5,358,976 | 10/1994 | Dowling | 522/180 |

FOREIGN PATENT DOCUMENTS

| | | | |
|---|---|---|---|
| 60-168707 | 9/1985 | Japan | C08F 24/00 |
| 2073760 | 10/1981 | United Kingdom | C08G 65/22 |
| WO92/12219 | 7/1992 | WIPO | C09K 19/54 |

OTHER PUBLICATIONS

Jacobine et al., *J. App. P. Poly. Sci.*, 45, 471–485 (1992).
N. A. Vaz, et al., "A Light Control Film Composed of Liquid Crystal Droplets Dispersed in a UV–Curable Polymer," *Liquid Crystal Journal*, vol. 146, pp. 1–15, 1987, Gordon & Breach.
Lerinda Frost, "Varilux: UV–cure speeds, elucidates processing of light–control films," *Search*, General Motors Technical Bulletin, Michigan, vol. 22, No. 2, May–Jun. 1987.
John L. West, "Phase Separation of Liquid Crystals in Polymers," *Journal of Molecular Crystals and Liquid Crystals*, vol. 157, pp. 427–441, 1988.
J. William Doane, "Polymer–Dispersed Liquid Crystals: Boojums at Work," *Materials Research Society Bulletin*, pp. 22–28, Jan. 1991.
Z. Z. Zhong, et al. "Dielectric Properties of a PMMA/E7 Polymer–Dispersed Liquid Crystal," *Journal of Polymer Science: Part B: Polymer Physics*, vol. 30, pp. 1443–1449, 1992, John Wiley.
Jacobine, et al., "Photocrosslinked Norbornene–Thiol Copolymers: Synthesis, Mechanical Properties and Cure Studies," *Journal of Applied Polymer Science*, vol. 45, pp. 471–475, 1992, John Wiley.

*Primary Examiner*—John C. Bleutge
*Assistant Examiner*—D. R. Wilson
*Attorney, Agent, or Firm*—Vidas, Arrett & Steinkraus

[57] ABSTRACT

A polymer dispersed liquid crystal composite prepared from: (1) at least one multifunctional electron-rich alkene that does not undergo appreciable homopolymerization and is selected from the group consisting of (a) vinyl ethers and vinyl sulfides; (b) keteneacetals, ketenethioacetals and methylene oxathiolanes, wherein the carbon of the carbon-carbon double bond not bearing the electron donating group has bonded to it H or a combination of H and a C1 to $C_6$ alkyl, preferably a methyl group; (c) ortho or para vinyl phenyl ethers or thioethers (also known as styryloxy or styrylthio ether monomers); or (d) bicylic alkenes which have, as a result of their stereoelectronic configuration, unequal π-electron density above and below the plane of the carbon-carbon double bond axis; (2) a multifunctional thiol; (3) a photoinitiator; and (4) liquid crystal material.

15 Claims, 1 Drawing Sheet

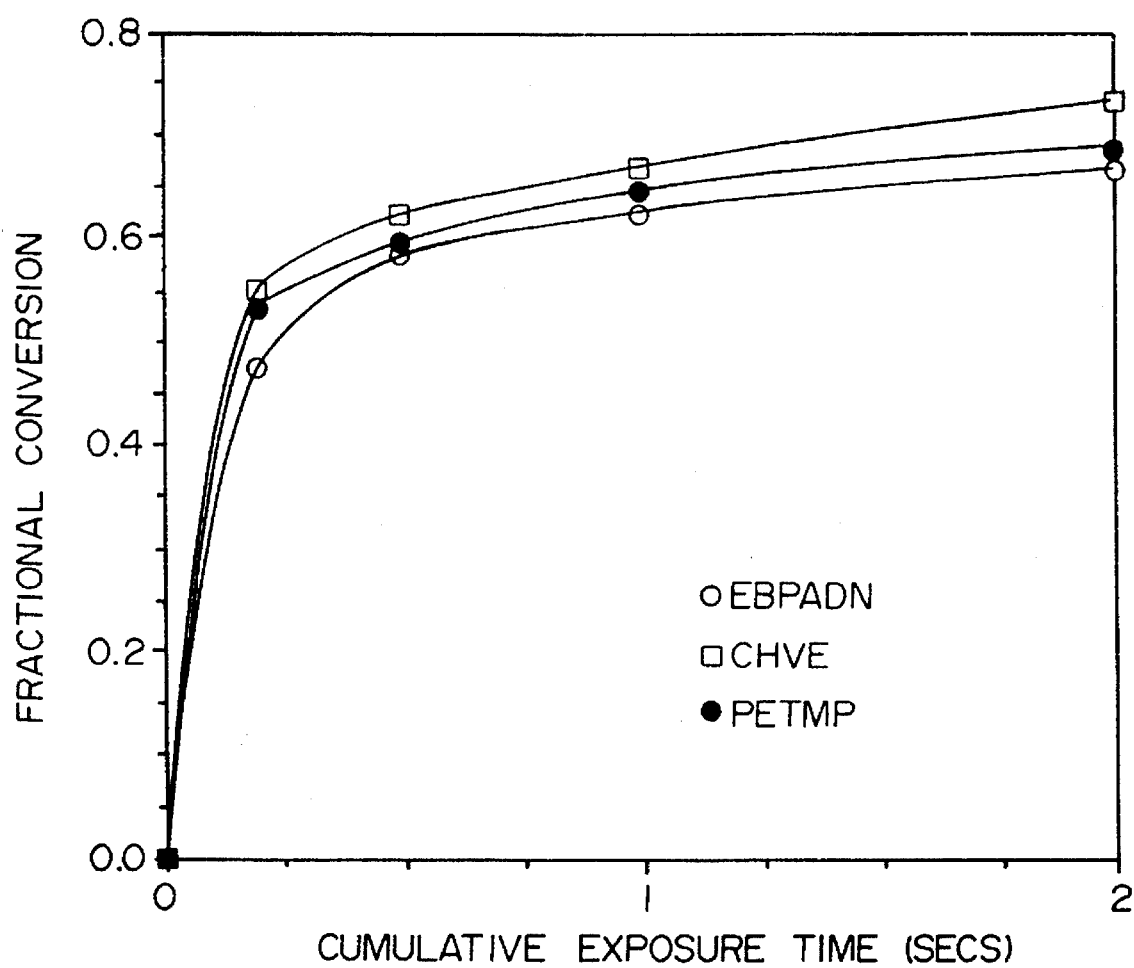

POLYMER DISPERSED LIQUID CRYSTALS IN RADIATION CURABLE ELECTRON-RICH ALKENE-THIOL POLYMER MIXTURES

This application is a division of application Ser. No. 08/279,936, filed Jul. 25, 1994, now abandoned, which is a continuation of Ser. No. 08/056,102, filed May 3, 1993, abandoned.

BACKGROUND OF THE INVENTION

1. Field of the Invention

This invention relates to a polymer-dispersed liquid crystal composite (hereinafter referred to as a PDLC composite) and, more particularly, to a PDLC composite based on an electron-rich alkenethiol polymer which is radiation curable and can be cast into a thin film.

PDLC composite systems are typically thin films composed of droplets of liquid crystals dispersed in a polymeric matrix. PDLC composite systems are of interest because they can be switched between an opaque state (light scattering) and a transparent state (light transmitting) by the application of a suitable electric or magnetic field, or by a significant change in temperature. A composite with these properties is possible because the liquid crystal is birefringent. It possesses two refractive index values: one value when the molecules comprising each droplet are randomly oriented, and a different value when the molecular axes of the molecules are aligned with respect to each other. Alignment of the axes occurs when a voltage, magnetic field, or significant change in temperature is applied to the PDLC composite. The liquid crystal and polymeric matrix are chosen so that the refractive indices of these two components match when the magnetic field, electric field or temperature is significantly varied, thus resulting in a transparent material. When the refractive indices of the polymer matrix and the LC are not identical or nearly identical, the dispersed LC droplets act to scatter light and an opaque material results.

PDLC composites are being used for, among other things, light valves, filters, shutters, electro-optic switches, information display arrangements (like the LCD watch), switchable windows and projection television.

2. Description of the Related Art

Various polymer matrices for PDLC systems have been proposed. For example, U.S. Pat. No. 4,728,547 issued to Vaz et al. discloses an optically responsive film comprising liquid crystals dispersed in a UV-curable ene-thiol, particularly thiol-allyl, polymer matrix. Suitable polymers are based on the reaction product of triallylisocyanurate and/or other suitable di- and tri-allyl ethers or esters and one or more polythiols and a photoinitiator such as benzophenone.

U.S. Pat. No. 4,869,847 issued to Leslie et al. discloses a polymer matrix for liquid crystal technology based on monomers derived from acrylic acid and methacrylic acid such as acrylates and methacrylates. Similarly, U.S. Pat. No. 5,011,624 issued to Yamagishi et al. discloses the use of three classes of acrylate monomers: esters derived from acrylic acid, esters derived from methacrylic acid, and amides derived from acrylic acid for use in PDLCs.

However, these prior art films often exhibit poor mechanical properties. The films have low tensile strength and thus are subject to breakage. One reason for this is that the liquid crystal material is an aggressive solvent and thus weakens the polymer matrix.

In addition, polymer matrices based on acrylates often gel too quickly, causing the formation of droplets that have an undesirable morphology. Ene-thiol matrices, on the other hand, often contain ionic containments which adversely affect the film's electrical, theological and physical properties. Ene-thiol matrices also cure slowly, which increases the processing time of the films.

Thus, there is a need for a polymer matrix which has good mechanical properties, especially high tensile strength, faster processing time, low ionic contamination, and provides film with good optical contrast between the "on" and "off" states.

BRIEF DESCRIPTION OF THE DRAWINGS

FIG. 1 is a graph of Fractional Conversion against Cumulative Exposure Time (seconds) for three monomers. ○ represents the norbornene monomer, □ represents the vinyl ether monomer and ● represents the thiol monomer.

BRIEF SUMMARY OF THE INVENTION

The present invention provides a polymer dispersed liquid crystal composite, which can be cast into a thin film, comprised of liquid crystal droplets dispersed in a crosslinked radiation cured polymer matrix.

Another aspect of the present invention provides a polymerizable mixture comprised of a multifunctional electron-rich alkene, a multifunctional thiol, a photoinitiator and a soluble liquid crystal material.

Yet another aspect of the present invention provides a polymerizable mixture or PDLC composite wherein the electron-rich alkene is norbornene. Still another aspect of the invention provides a polymerizable mixture or PDLC composite wherein the electron-rich alkene is vinyl ether.

Other advantages of the invention will be better appreciated from a detailed description thereof which follows.

DETAILED DESCRIPTION OF THE PREFERRED EMBODIMENT

The composite material is prepared by forming a solution of two components, a liquid crystal material and a curable polymerizable mixture which comprises a multifunctional electron-rich alkene, a multifunctional thiol and a small amount of a photoinitiator. The liquid crystal material is chosen to be miscible in the polymerizable mixture and relatively immiscible in the cured polymer matrix. As the curable polymerizable mixture undergoes polymerization, the liquid crystals become less miscible, and a phase separation of the liquid crystals from the partially polymerized and subsequently polymerized polymer matrix occurs. Thus droplets of the liquid crystal are formed within the polymer matrix.

The liquid crystal material cannot diffuse large distances through the polymer matrix as the droplets are formed, which results in a uniform spatial distribution of droplets. Also, the droplets are generally uniform in shape and size. This is because there are no constraints or controls exerted on the droplets as they form and grow. Since all the regions of the polymer matrix are essentially similar, all of the droplets are similarly formed.

Depending upon the selection of the liquid crystal material and the constitutents of the polymerizable mixture, after polymerization has occurred, there might still be liquid crystal material that is miscible in the polymer matrix. However, it is desirable to have as low a residual concentration of the liquid crystal material dissolved in the polymer matrix after the polymerization and phase separation occurs, as possible. This achieves two purposes. First, the higher the amount of liquid crystal material which separates from the polymer matrix and forms droplets, the better the optical properties of the resulting film will be. Second, the lower the residual concentration, the less expensive the film will be to produce because, if a substantial portion of the liquid crystal material separates out, less of the costly liquid crystal material needs to be used in the first place.

The multifunctional electron-rich alkenyl component of the present invention can be any alkene that does not undergo appreciable homopolymerization and is selected from the group consisting of:

(a) vinyl ethers and vinyl sulfides;
(b) keteneacetals, ketenethioacetals and methylene oxathiolanes wherein the carbon of the carbon-carbon double bond not bearing the electron donating group has bonded to it H, or a combination of H and a $C_1$ to $C_6$ alkyl, preferably a methyl group;
(c) ortho or para vinyl phenyl ethers or thioethers (also known as styryloxy or styrylthio ether monomers); or
(d) bicyclic alkenes which have, as a result of their stereoelectronic configuration, unequal π-electron density above and below the plane of the carbon-carbon double bond axis.

Extensive examples of suitable electron-rich alkenes useful in this inventive composite are contained in U.S. Pat. Nos. 3,661,744, 4,119,617, 4,157,421, 4,808,638, 5,021, 512, 4,957,998, 5,013,821, 4,304,767 and Japanese Patent Disclosure Bulletin No. 60-168707. Preferred alkenes are defined by (a) and (d) above. The most preferred alkenes are norbornenyl monomers and vinyl ether monomers.

Suitable norbornenyl monomers are compounds containing a plurality of norbornenyl functional groups. Examples of norbornenyl compounds may be found in U.S. Pat. No. 5,034,490, in copending U.S. application Ser. No. 07/619, 068, filed Nov. 28, 1990, and in U.S. Pat. No. 5,167,882, all incorporated herein by reference. Preferred norbornenyl compounds are those which include groups of the formula:

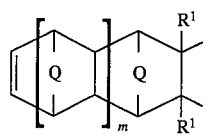

where Q is $CH_2$, $CHCH_3$, $C(CH_3)_2$, O, S, $NR^1$ or $SO_2$, $R^1$ is H or alkyl and m is 0–10. These monomers are described in U.S. Pat. No. 4,808,638, which is incorporated herein by reference. Examples are nonbornenecarboxylate esters of the formula:

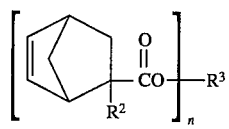

where n is an integer of 2 or more, $R^2$ is H or methyl and $R^3$ is the residue of a plural hydroxy compound. Such norbornenecarboxylate esters are suitably produced by Diels-Alder addition of cyclopentadiene to compounds having multiple acrylate or methacrylate ester groups, and include ethoxylated bisphenol A dinorbornenecarboxylate and hexanediol dinorbornenecarboxylate (HDDN). The most preferred norbornenyl compound is ethoxylated bisphenol A dinorbornene (EBPADN).

Norbornenyl compounds with silicone moieties having the formula:

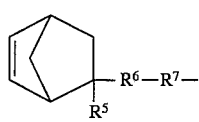

bound to silicon atoms thereof, where $R^5$ is H or methyl, $R^6$ is a direct bond or —C(=O)O—, and $R^7$ is a divalent alkylene or alkenylene, can also be employed. These monomers are described in U.S. Pat. No. 5,034,490, which is incorporated herein by reference.

Suitable vinyl ethers are disclosed in U.S. Pat. No. 5,045,572, U.S. Pat. No. 5,082,874, U.S. Pat. No. 4,864,054, U.S. Pat. No. 2,836,603, U.S. Pat. No. 5,070,117 and UK Application No. 2,073,760 A, all incorporated herein by reference. The preferred vinyl ethers are defined in U.S. Pat. No. 5,070,117 and have the formula:

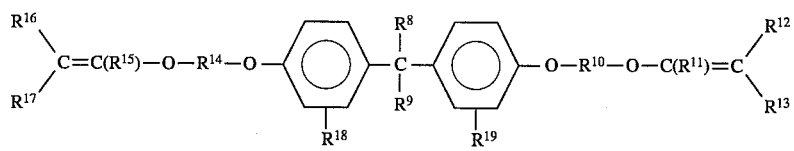

wherein $R^8$, $R^9$, $R^{11}$, $R^{12}$, $R^{13}$, $R^{15}$, $R^{16}$ and $R^{17}$ are independently selected from hydrogen, halogen, and $C_1$–$C_8$ alkyl radicals; $R^{10}$ and $R^{14}$ are independently selected from alkylene radicals; and $R^{18}$ and $R^{19}$ are independently selected from allyl and methallyl.

The most preferred vinyl ethers are defined in U.S. Pat. No. 5,045,572 and have the formula:

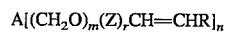

wherein A is a carbon atom, —OCH=CHR, an n-valent hydrocarbyl radical derived from a $C_1$ to $C_{10}$ alkane or a $C_3$ to $C_8$ cycloalkane; R is H, $C_1$ to $C_6$ alkyl; Z is $C_2$ to $C_8$ alkyleneoxy; r has a value of from 0 to 15; m has a value of from 0 to 1 and at least one of r and m has a positive value; n has a value of from 1 to 4, with the proviso that m is 0 and n is one when A is —OCH=CHR, n has a value of 2 when A is a bivalent hydrocarbyl radical derived from a $C_1$ to $C_{10}$ alkane or a $C_3$ to $C_8$ cycloalkane, n has a value of 3 when A is a trivalent hydrocarbyl radical derived from a $C_1$ to $C_{10}$ alkane or a $C_3$ to $C_8$ cycloalkane and n is 4 when A is carbon.

Mixtures of two or more of the multifunctional electron-rich alkene monomers of the current invention may be used. For instance, mixtures of norbornenyl monomers, of vinyl ether monomers, and of norbornenyl and vinyl ether monomers may be employed. However, to be useful, the monomers in the mixture must polymerize with thiol at substantially similar rates. If copolymerization rates are substantially different, inhomogeneities may occur within the matrix rendering the composite unsuitable for optical use. The benefit of using more than one monomer type is that a wide range of different formulations and hence properties (optical, electrical and mechanical) may be obtained simply by changing the ratio of the two electron-rich alkene monomers.

The multifunctional thiol component of the inventive compositions may be any compound having two or more thiol groups per molecule. Suitable polythiols are described in U.S. Pat. No. 3,661,744 at Column 8, line 76, through Column 9, line 46; U.S. Pat. No. 4,119,617, Column 7, lines 40–57; U.S. Pat. No. 4,445,419; U.S. Pat. No. 4,289,867; and U.S. Pat. No. 4,808,638. Preferred multifunctional thiols are obtained by esterification of the polyol with an α-or β-mercaptocarboxylic acid such as thioglycolic acid or 3-mercaptopropionic acid. The preferred multifunctional thiol ester is pentaerythritol tetrakis-β-mercaptopropionate (PETMP).

While the inventive composition may include both difunctional electron-rich alkene and difunctional thiol compounds, it will be understood that at least a portion of at least one of these components should contain more than two functional groups per molecule to produce a crosslinked step-growth polymer when cured. That is, the total of the average number of electron-rich alkenyl groups per molecule of ene functional compound or the average number of vinyl ether groups per molecule of vinyl ether functional compound and the average number of coreactive thiol groups per molecule of the thiol functional compound should be greater than 4 to produce a crosslinked cured network. This total is referred to as the "total reactive functionality" of the composition.

The ratio of the multifunctional electron-rich alkene component to the multifunctional thiol component can vary widely. Generally, the equivalent weight ratio of norbornenyl groups or vinyl ether groups to thiol groups can be from about 0.5:1 to about 2.0:1, preferably from about 0.7:1 to about 1.3:1, and most preferably about 1:1.

The photoinitiator component of the inventive compositions may be any photoinitiator commonly known in the art, which will not interfere with the liquid crystal material during phase separation. Examples of suitable photoinitiators are described in "Mechanisms of Photophysical Processes and Photochemical Reactions in Polymers" by J. F. Rabek, pp 228–337 (1987). The preferred photoinitiators are the aromatic ketones such as acetophenone, chlorinated acetophenone, dialkoxyacetophenones, dialkylhydroxyacetophenones, dialkylhydroxyacetophenone alkyl ethers, 1-benzoylcyclohexanol-2, benzoin, benzoin acetate, benzoin alkyl ethers, dimethoxybenzoin, deoxybenzoin, dibenzyl ketone, acyloxime esters, acylphosphine oxides, acylphosphonates, ketosulphides, dibenzoyl disulphides, and diphenyldithiocarbonate. Mixtures of photoinitiators can also be employed. The photoinitiator can be employed in an amount of between about 0.1 to 10%, preferably between about 0.5 to 8% and most preferably about 1–2% by weight of the curable composition.

In addition, if norbornene silicone formulations are used, photoinitiators with organosiloxane polymer backbones such as the compounds disclosed in U.S. Pat. Nos. 4,477,326, 4,507,187, 4,587,276, 4,534,838 and 4,666,953 all incorporated herein by reference, may be employed.

The inventive compositions can be formulated so that electron beam, ultra-violet, visible light, infrared or microwave electromagnetic radiation can be employed to polymerize the composition. A person skilled in the art would recognize the initiator to employ depending on the desired curing means.

An inhibitor may be employed in the inventive compositions if desired. Suitable free radical inhibitors include sulfur, phenothiazine, hydroquinone, and butylated hydroxy toluene at levels of between 0.5 and 5% by weight of the curable composition. The free radical inhibitor can also be a hydroxylamine compound or salt, most preferably an N-nitrosoarylhydroxylamine or complex salt thereof, such as the ammonium, sodium, potassium, magnesium, strontium, aluminum, copper, zinc, cerium, iron, nickel, and cobalt salts of N-nitrosoarylhydroxylamine. The aluminum salt of N-nitrosoarylhydroxylamine sold under the tradename Q1301 by IWKO Industries is preferred. Suitable levels of these hydroxylamine compounds or salts are between about 250 ppm and 10,000 ppm and preferably between about 50 to 1500 ppm.

The liquid crystal material may be any liquid crystal material that is known in the art to be useful in PDLC composites, such as nematic, cholesteric and smectic types. The material must be soluble in the prepolymer composition and largely insoluble or sufficiently insoluble in the resulting polymer matrix to form discrete liquid crystal droplets. The invention is applicable to homogenous liquid crystal material and blends of liquid crystal materials. The liquid crystals of the invention should be a pure low molar mass (i.e., less than 1,000 molecular units) liquid crystal, in a liquid form. A meltable solid liquid crystal may be employed if the crystal's melting temperature does not exceed the degradation temperature of the liquid crystal, the degradation temperature of the monomer formulation, and the temperature at which the monomer will cure. Examples of suitable liquid crystal materials are disclosed in WO 91/05029, which is incorporated herein by reference. One useful type of liquid crystal material is the class commonly known as cyanobiphenyls.

The amount of liquid crystal employed is not critical and varies according to the type of liquid crystal used and the formulation of the composite. Liquid crystal material can be added up to the maximum level of solubility. Generally, the useful range of liquid crystal material is between about 20 to about 90%, preferably between about 30 to about 80% and most preferably between about 40 to about 75% by weight of the curable composition. If too little liquid crystal material is used, the PDLC composite will not provide a useful optical film because there will be little contrast between the on/off states. However, if too much liquid crystal is added, the physical properties of the crosslinked polymer matrix will be adversely affected. A person skilled in the art through simple experimentation can determine the optimum formulation and amount of liquid crystal material to employ, depending on the intended application of the PDLC composite.

The invention may be illustrated by the following non-limiting examples.

EXAMPLES

Example 1

Preparation of Norland 65/E7 Photocrosslinked Film

Twenty-eight grams of Norland 65 (an ene-thiol monomer commercially available from Norland Products, Inc. of New Brunswick, N.J.) and E7 (a liquid crystal material commercially available from EM Industries, Hawthorne N.Y.) were mixed in the dark for twenty minutes using an air motor.

Norland 65 is believed to contain approximately 55 mole percent triallyl isocyanurate, approximately 41 mole percent pentaerythritol tetrakis(2-mercapto-propanoate) and approximately 4 mole percent benzophenone. E7 is believed to contain approximately:

51 percent by weight of the commonly known liquid crystal component 5CB having the chemical name [1,1'Biphenyl], 4-carbonitrile, 4'-pentyl;
25 percent by weight of the commonly known liquid crystal component 7CB having the chemical name [1,1'Biphenyl], 4-carbonitrile, 4'-heptyl;
16 percent by weight of the commonly known liquid crystal component 80CB having the chemical name [1,1'Biphenyl], 4-carbonitrile, 4'octyloxy; and
8 percent by weight of the commonly known liquid crystal component 5CT having the chemical name [1,1'4'-1'Terphenyl], 4-carbonitrile, 4'pentyl.

The mixed material (Norland 65 and E7) was deaerated in a vacuum oven at room temperature for about two hours and then placed in a sandwich type assembly. The assembly consisted of a piece of glass 6"×9", a similar piece of Mylar, a 10 mil thick aluminum spacer (which is a rectangular frame, also approximately 6"×9"), then approximately fifteen grams of the resin followed by another piece of Mylar, and piece of glass. The entire assembly was surrounded by a stainless-steel chase drilled so that screws could be put through and tightened. The chase fit completely around the perimeter of the glass plates and screws were inserted around all four sides uniformly. Wingnuts were used to uniformly tighten the chase down onto the plates. This ensured uniform thickness and curing.

A Fusion Systems™ ultraviolet oven was used to cure the film. A "D" bulb was used, and speed was chosen to be 30% of full capability. Six passes per flat side were used to insure cured solid film. This corresponds to a total fluence (incident energy/per unit area) of 5070 mJ/cm².

The resulting film was very "oily", which might indicate incomplete curing. It was soft, but not cheesy, and clear with a milky cast to it.

Example 2

Preparation of Norland 65/TM 75A

Twenty-eight grams of Norland 65 and twelve grams of TM75A (a liquid crystal commercially available from EM Industries, Hawthorne, N.Y.) were mixed in the dark for twenty minutes and deaerated under vacuum. TM75A is believed to be comprised of the following components:

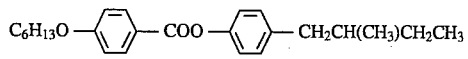   CE4

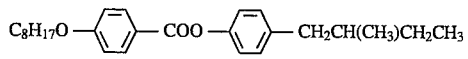   CE5

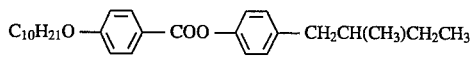   CE6

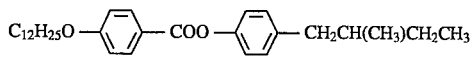   CE7

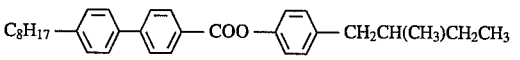   CE8

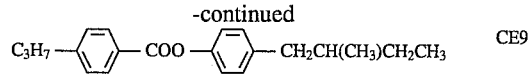   CE9

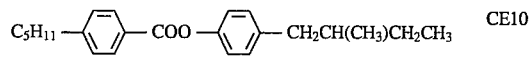   CE10

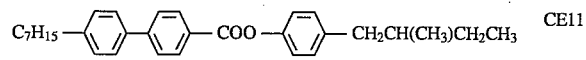   CE11

A cured film was prepared according to the procedure in Example 1. The resulting film was opaque.

Example 3

Preparation of EBPA-DN/PETMP

First, EBPA-DN was prepared. One mole of Sartomer 351™ (diacrylate ester of ethoxylated bisphenol A) was stirred at 40° C. and freshly cracked cyclopentadiene (2.2 equivalents) was added at such a rate that the reaction temperature rose to ca. 75° C. The reaction mixture was then stripped on a rotary evaporator. Analysis of the reaction mixture by HPLC showed the conversion to be complete.

Next, the EPBA-DN was purified. The resin was filtered at 50° C. through a coarse frit Celite® C bed and then treated with 2 wt % Magnesol® silicated magnesium oxide, stirred three hours at 45° C. and allowed to sit overnight. Celite® filter aid, 3 wt %, was added, mixed for one hour at 45° C. and then the mixture filtered at 70° C. using a 1μ pad. Further amphoteric substances which can also be used to purify thiol-nene resins are disclosed in cofiled and copending application entitled "High Purity Resins for Thiol-ene Polymerizations and Method for Producing Same" by David M. Glaser, Paul J. Grabek and Anthony F. Jacobine having a filing date of Apr. 30, 1993, now U.S. Pat. No. 5,399,624.

Then 577.4 grams of the prepared and purified EBPA-DN, 222.5 grams of PETMP (pentaerythritol tetramercaptopropionate commercially available from Evans Chemetrics, Lexington, Mass.), 1.5% by weight Darocur 1173 (a photoinitiator comprised of hydroxyisobutyrophenone, commercially available from EM Industries, Hawthorne, N.Y.), and 250 ppm of Q-1301 (a stabilizer commercially available from MAKO Industries) were mixed together. This constituted the base EBPA-DN formulation.

Example 4

Preparation of EBPA-DN/PETMP/TM75A PDLC Film

Twenty-eight grams of the EBPA-DN/PETMP base formulation synthesized in Example 3 and twelve grams of TM75A were mixed for twenty minutes in the dark.

The resulting mixture was viscous. After deaerating at room temperature under vacuum for about three hours, it was wrapped to prevent light or moisture from entering, and refrigerated overnight to prevent reaction. The next day, the mixture was removed from refrigaeration and allowed to sit covered for about an hour to come to room temperature and then unwrapped.

The procedure outlined for Norland 65/E7 in Example 1 was followed to prepare a cured film. The resulting film was opaque.

Example 5

Preparation of EBPA-DN/PETMP Formulation with E7 Film

Twenty-eight grams of the EBPA-DN/PETMP base formulation synthesized in Example 3 and twelve grams of E7 were mixed in the dark using an air motor for about twenty minutes. The mixture was then deaerated for about three hours at room temperature under vacuum and then covered and stored under refrigeration overnight. It was allowed to warm up to room temperature for about thirty minutes, uncovered and then a cured film was prepared according to the procedure outlined in Example 1 above. The resulting film was clear.

The mechanical properties of the compositions prepared in Examples 1–5 were measured at room temperature. The results are collected in Table 1 below:

TABLE 1

| Formulation | Tensile Modulus (E). psi [MPa] | Stress at Max. Load, psi [MPa] | Elongation at Break (ε), % |
|---|---|---|---|
| Norland 65 | 860 ± 30 [5.9 ± 0.2] | 320 ± 25** [2.2 ± 0.2] | 48 ± 4 |
| Norland 65/ TM75A | 500 ± 21 [3.45 ± 0.15] | 180 ± 11** [1.24 ± 0.08] | 44 ± 3 |
| Norland 65/ E7 | 590 ± 52 [4.07 ± 0.35] | 83 ± 6** [0.57 ± 0.04] | 16 ± 1 |
| EBPA-DN/ PETMP | 225,560 ± 20,230 [1,550 ± 140] | 5,430 ± 390** [37 ± 2.7] | 4.3 ± 0.6 |
| EBPA-DN/ PETMP/ TM75A | 86,850 ± 13,400 [600 ± 90] | 1,330 ± 270# [9.2 ± 1.9] | 24 ± 10 |
| EBPA-DN/ PETMP/E7 | 400 ± 25 [2.76 ± 0.17] | 110 ± 20** [0.76 ± 0.14] | 35 ± 7 |

**Material did not yield.
Material yielded; max stress is its yield strength.

As can be seen in Table 1, the inventive film with TM75A liquid crystal as compared to the Norland/TM75A film, has a higher tensile modulus and can withstand higher stress at maximum load. This means the inventive films have stronger mechanical properties which is of use in many applications.

The inventive film with E7 liquid crystal has a slightly lower tensile modulus than the comparable Norland film. It is believed that E7 liquid crystal is a particularly aggressive solvent in the inventive polymer matrix.

The electrical properties of the films prepared in Examples 1–5 were tested. The results are collected in Table 2 and Table 3 below.

TABLE 2

ELECTRICAL PROPERTIES

| TEST METHOD | TEST SPECIMENS | REPLICATES |
|---|---|---|
| Dielectric Strength ASTM D-149 Volume & Surface Resistivity ASTM D-257 Dielectric Constant & Dissipation Factor ASTM D-150 Cure Conditions: 5070 mJ/cm$^2$ using Fusion System with D Bulb | 3 ¼ × 3 ¼ × 0.015 thick cured films | 2 |

| Product Tested | Specimen No. | Volume Resistivity (Ohm-Cm) | Surface Resistivity (OHMS) | Dielectric Strength V/MIL | Dielectric Constant @ 500 HZ | Dissipation Factor @ 500 HZ |
|---|---|---|---|---|---|---|
| ESPA-DN/ PETMP | 1 | 4.218E16 | 1.880E17 | 451 | 3.118 | 0.0032 |
| | 2 | 3.98BE16 | 1.880E17 | 767 | 3.067 | 0.0032 |
| EBPA-DN/ PETMP/E7 | 1 | 2.453E15 | 1.880E17 | 354 | 8.651 | 0.1492 |
| | 2 | 1.356E15 | 1.880E17 | 295 | 8.726 | 0.1444 |
| EBPA-DN/ PETMP/TM75A | 1 | 1.991E16 | 1.880E17 | *67 | 3.923 | 0.0124 |
| | 2 | 1.856E16 | 1.880E17 | 340 | 3.362 | 0.0108 |
| Norland 65 | 1 | 1.039E15 | 1.880E17 | 441 | 6.608 | 0.1585 |
| | 2 | 8.418E14 | 1.880E17 | 282 | 7.120 | 0.1722 |
| Norland 65/E7 | 1 | 1.150E15 | 9.400E16 | 483 | 13.221 | 0.1476 |
| | 2 | 8.418E14 | 1.128E17 | 849 | 11.681 | 0.1252 |
| Norland 65/TM75A | 1 | 1.315E15 | 1.880E17 | 830 | 5.810 | 0.1164 |
| | 2 | 2.032E15 | 1.880E17 | 1323 | 5.919 | 0.1172 |

*Failure appeared to be in the area of an air bubble.

TABLE 3

ELECTRICAL PROPERTIES

| TEST METHOD | TEST SPECIMENS | REPLICATES |
|---|---|---|
| Dielectric Constant Dissipation Factor ASTM D-150 Cure Conditions: 5070 mJ/cm$^2$ using Fusion System with D Bulb | 3 ¼ × 3 ¼ × 0.015 thick cured films | 2 |

| | Dielectric | Dissipation | Dielectric | Dissipation |

TABLE 3-continued

ELECTRICAL PROPERTIES

| TEST METHOD | | TEST SPECIMENS | | REPLICATES | |
|---|---|---|---|---|---|
| Product Tested | Specimen No. | Constant @ 1 KHZ | Factor @ 1 KHZ | Constant @ 1 MHZ | Factor @ 1 MHZ |
| EBPA-DN/ | 1 | 3.107 | 0.0032 | 2.999 | 0.0212 |
| PETMP | 2 | 3.430 | 0.0031 | 3.010 | 0.0227 |
| EBPA-DN/ | 1 | 7.405 | 0.1641 | 3.683 | 0.0735 |
| PETMP/E7 | 2 | 8.026 | 0.1730 | 3.721 | 0.0760 |
| EBPA-DN/ | 1 | 3.874 | 0.0108 | 3.617 | 0.0303 |
| PETMP/TM75A | 2 | 3.136 | 0.0094 | 3.277 | 0.0241 |
| Norland 65 | 1 | 6.169 | 0.1493 | 3.951 | 0.0677 |
| | 2 | 6.576 | 0.1599 | 4.294 | 0.0760 |
| Norland 65/ | 1 | 12.140 | 0.1800 | 4.547 | 0.1364 |
| E7 | 2 | 11.337 | 0.1615 | 4.424 | 0.1364 |
| Norland 65/ | 1 | 5.741 | 0.1178 | 4.126 | 0.0610 |
| TM75A | 2 | 6.043 | 0.1228 | 3.985 | 0.0624 |

The dielectric constant, dissipation factor and dielectric strength reflect a material's electrical robustness, i.e., its ability to withstand and respond to the applied voltage repeatedly. A low dissipation factor, a low dielectric constant and a high dielectric strength indicate a robust material. In addition, a low dielectric constant indicates the material is well-cured and its physical properties will not change over time.

As can be seen from Tables 2 and 3, the inventive films at the three tested frequencies (500 HZ, 1 KH and 1 MH) have lower dielectric constants and lower dissipation factors than the comparable Norland films. At two of the frequencies tested (1 KH and 1 MN), it also has an averaged lower dissipation factor. It is not clear why the dielectric strength measurements of the inventive films were lower than for the Norland films. Normally a material with a low dielectric constant will have a high dielectric strength. It should be noted that dielectric strength tests are difficult to perform properly and the results are highly dependent on operator experience, surface flaws, and environmental conditions.

Example 6

Preparation of PDLC Using a Crosslinked Norbornene Siloxane/Thiol Siloxane Copolymer as the Matrix Material A norbornene siloxane/thiol siloxane composition was prepared according to the following formulation:

| | |
|---|---|
| Norbornene siloxane monomer* | 100 g |
| Thiol siloxane crosslinking agent GT367** | 7.24 g |
| DEAP*** | 2% |

*α,ω-bis(5-ethylnorborn-2-enyl)polydimethylsiloxane a copolymer of 3-mercaptopropyl methyl siloxane and dimethyl/siloxane commercially available from Genesee Polymers, Michigan
***α, α-diethoxyacetophenone, a photoinitiator commercially available from First Chemical Corporation, Pascagoula, Mississippi The ingredients were mixed using an air motor with a high-shear blade. Then, nine grams of the above formulation were mixed with one gram of El8 (a liquid crystal material commercially available from EM Industries and believed to be similar in composition to E7, which has been described above). Films with thicknesses of 20 ml were prepared, using a Teflon spacer sandwiched between two sheets of Mylar, which were then placed between two glass plates. Springloaded clamps were used to evenly compress the assembly around its perimeter. The film was cured in a Technicure oven for 60 seconds per side.

Example 7

Preparation Of PDLC Composite Employing Combination of Monomers

The following materials were blended together under yellow lighting:

| | |
|---|---|
| EPBA-DN (norbornene monomer) | 16.607 g |
| CHVE* (vinyl ether monomer) | 4.886 g |
| PETMP (thiol monomer) | 12.203 g |
| DAROCUR 1173 (photoinitiator) | 0.640 g |
| WAKO Q-1301 (stabilizer) | 0.034 g |

*1,4-cyclohexanedimethanol divinyl ether supplied by ISP Technologies, NJ.

The composition contains equimolar quantities of two different electron-rich alkenes of the norbornenyl and vinyl ether types, which were blended together with a stoichiometric amount of tetra thiol, PETMP. An infrared spectrum of the blended composition shows characteristic absorbance peaks of the three main monomer components at 715 cm$^{-1}$ due to the norbornenyl monomer (asymmetric carbon-hydrogen bending vibration of cis-alkene); at 1641 cm$^{-1}$ due to the vinyl ether monomer (carbon-carbon double bond stretching vibration); and at 2570 cm$^{-1}$ due to the thiol monomer (sulfur-hydrogen stretching vibration).

On exposure to UV light, the composition underwent a polymerization reaction, which converted the liquid composition to an optically clear and transparent solid polymer, consuming the alkene and thiol monomers. As the reaction proceeded, the characteristic absorbance peaks of the monomers decrease in relation to the residual concentration of monomer, disappearing on complete consumption. By measuring the absorbance of these peaks before, during and after UV light exposure, the relative reactivity of the different monomers and the overall polymerization rates may be estimated by known methods for quantitative analysis.

A uniform thin film of the above composition was prepared on a potassium bromide disc and exposed to a collimated beam of UV light from a medium pressure Hg arc lamp at an irradiance of 9.8 mW/cm$^2$ centered at 365 nm. The exposure was periodically interrupted by means of an electronically controlled shutter and the monomer conversions determined as a function of fluence (defined as the incident energy/per unit area) and exposure time using the infrared spectral method described above. The results of the study are reported in Table 4 below.

TABLE 4

| Cumulative Exposure Time (secs) | Fluence (mJ/cm$^2$) | Monomer Conversion | | |
|---|---|---|---|---|
| | | EBPA-DN | CHVE | PETMP |
| 0 | 0 | 0 | 0 | 0 |
| 0.2 | 1.96 | 0.47 | 0.55 | 0.53 |
| 0.5 | 4.90 | 0.58 | 0.62 | 0.60 |
| 1.0 | 9.80 | 0.62 | 0.67 | 0.64 |
| 2.0 | 19.60 | 0.66 | 0.73 | 0.68 |

The conversion rates of all the monomers are comparable within the experimental error of the method. These results, along with the fact that the films were optically clear, show that the rate of thiol addition to the norbornenyl and vinyl ether monomers is almost identical. This is clearly illustrated by the graph of FIG. 1 which plots fractional conversion versus time. Fractional conversion indicates the amount of polymerization that has occurred.

As can be seen from the graph, the polymerization rates of the individual monomers are indistinguishable during the initial period of the reaction. Also, there is a close similarity in the degree of polymerization obtained after irradiation is complete. This suggests that compositions containing blends of norbornenyl and vinyl ether monomers cure to give a homogeneous polymer network suitable for the production of PDLC devices.

Example 8

A PDLC composite was prepared according to the following formulation:

| Vectomer 4020 | 10.921 g |
|---|---|
| PETMP | 6.115 g |
| Darocur 1173 | 0.325 g |
| WAKO Q-1301 | 0.0173 g |

Vectomer 4020 is bis-(4-vinyl oxymethyl cyclohexyl methyl) glutarate available from Allied Signal Corp., Des Plaines, Ill.

A proprietary liquid crystal material supplied by E. Merck and designated as 8402 was found to be 49% (by weight) soluble in this composition at 22° C.

Example 9

A PDLC composite was prepared having the following formulation:

| Poly THF [250] Divinyl Ether | 8.95 g |
|---|---|
| PETMP | 6.099 g |
| Darocur 1173 | 0.288 g |
| WAKO Q-1301 | 0.015 g |

Poly THF [2501 Divinyl Ether is a polytetrahydrofuran divinyl ether commercially available from BASF AKti enegesell schaft, Ludwi gshafen, Germany as BASF 290.

A proprietary l i quid crystal material supplied by E. Merck and designated as 8402 was found to be more than 57% and less than 67% soluble in the polymer matrix.

As can be seen from Examples 8 and 9, the matrix system of the invention is clearly capable of handling a high liquid crystal loading which will result in a film with superior optical properties.

Example 10

A photocurable PDLC matrix composition was prepared by blending together the following materials under dim UV free lighting:

| Hexanediol dinorbornenecarboxylate (HDDN) | 358.0 g |
|---|---|
| PETMP | 244.0 g |
| 40:1 solution of Darocur 1173:Q1301 | 12.04 g |

The thiol component (PETMP) was added to the mixture of norbornenyl monomer and photoinitiator/stabilizer solution and mechanically stirred at room temperature for 40 minutes under a head purge of nitrogen. A PDLC film was prepared by adding liquid crystal blend E7 to the photocurable composition and then curing by exposure to UV light. The solubility of the E7 in the photocurable composition was found to be 75%. The cured composition was white and opaque. A thin film of the cured composition was prepared between a pair of transparent electrodes. On application of a sufficient voltage, the composite became cl ear and transparent. When the voltage was removed, the composite returned to the opaque state. The holding ratio, which is the fraction of the original voltage still held on a pixel element after 100 milliseconds, was 0.90.

Example 11

A photocurable PDLC matrix composition was prepared according to the procedure of Example 10, by blending together the following materials:

| EBPA-DN | 317.0 g |
|---|---|
| PETMP | 122.0 g |
| 40:1 solution of Darocur 1173:Q1301 | 8.79 g |

The solubility of liquid crystal blend E7 was 70%. A PDLC film was prepared according to the procedure of Example 9 and the performance was found to be similar. The holding ratio was 0.96.

Example 12

A photocurable norbornene-thiol composition was prepared, according to the procedure of Example 10, by blending together the following materials:

| Polyethyleneglycol dinorbornenecarboxylate (EW 327) | 163.9 g |
|---|---|
| PETMP | 61.3 g |
| 40:1 solution of Darocur 1173:Q1301 | 4.50 g |

A photocurable PDLC matrix composition, containing a blend of different norbornenyl monomers was prepared by blending together an equal amount of this composition with the matrix composition of Example 10:

| Composition of Example 10 | 180.1 g |
|---|---|
| Composition of this example | 180.1 g |

A PDLC film was prepared by the addition of liquid crystal blend E7 to the mixed norbornenyl product. The solubility of liquid crystal E7 was 70%. A PDLC film was prepared according to the procedure of Example 9 and the performance was found to be similar. The holding ratio of the composition was 0.82.

Example 13

Comparative Example

A PDLC film was prepared, from the allyl-thiol photocurable matrix composition Norland NOA 65, according to the procedure of Example 10.

While the product behaved in a similar manner to the norbornenylthiol products of Examples 10–12, the solubility of liquid crystal E7 was found to be only 0.65 and the holding ratio 60%.

As can be seen from Examples 10–13, the inventive compositions all have higher liquid crystal solubilities in the uncured prepolymer composition than the prior art composition (Example 13}. This means the inventive compositions can be loaded with higher amounts of liquid crystal material which results in films with better optical properties.

Also the inventive compositions have higher holding ratios than the prior art composition. This signifies that the inventive films will have higher contrast and will be suitable for use over active matrix substrates, such as are required for the production of projection TV images.

Obviously, other modifications and variations to the present invention are possible and may be apparent to those skilled in the art in light of the above teachings. Thus, it is to be understood that such modifications and variations to the specific embodiments set forth above, are to be construed as being within the full intended scope of the present invention as defined by the appended claims.

We claim:

1. A radiation curable polymerizable mixture comprising:
   a multifunctional thiol.
   at least one multifunctional electron-rich alkene which does not undergo appreciable homo polymerization and is selected from the group consisting of:
   (a) vinyl ethers and vinyl sulfides;
   (b) keteneacetals, ketenethioacetals and methylene oxathiolanes wherein the carbon of the carbon-carbon double bond not bearing the electron donating group, has bonded to it H or a combination of H and a $C_1$ to $C_6$ alkyl;
   (c) ortho or para vinyl phenyl ethers or thioethers; and
   (d) bicylic alkenes which have as a result of their stereoelectronic configuration unequal π-electron density above and below the plane of the carbon-carbon double bond axis,
   a photoinitiator, and
   a liquid crystal material soluble in said polymerizable mixture in an amount of between about 20 and about 90% by weight of the mixture, said liquid crystal having a molecular weight of less than 1000, wherein the total reacting functionality of the mixture being greater than 4 and the ratio of equivalents of thiol to electron-rich alkene component being from about 0.5;1 to about 2.0:1, and wherein after 100 milliseconds the fraction of the initial voltage sufficient to make a film of the cured mixture clear and transparent, remaining on a pixel element, is 0.82 or higher.

2. The polymerizable mixture of claim 1 wherein the multifunctional electron-rich alkene is selected from the group consisting of vinyl ether functional resins, norbornenyl functional resins and a mixture of both.

3. The polymerizable mixture of claim 1 wherein the multifunctional electron-rich alkene is ethoxylated bisphenol A di(norbornene carboxylate) and the multifunctional thiol is pentaerythritol tetra-(3-mercaptopropionate).

4. The polymerizable mixture of claim 1 wherein the multifunctional electron-rich alkene is polytetrahydrofuran divinyl ether and the multifunctional thiol is pentaerythritol tetra-(3-mercaptopropionate).

5. The polymerizable mixture of claim 1 wherein the equivalent weight ratio of the electron-rich alkene to the multifunctional thiol ranges from about 0.7:1 to 1.3:1.

6. The polymerizable composition of claim 1 wherein the equivalent weight ratio of the electron,rich alkene to the multifunctional thiol is about 1:1.

7. The polymerizable mixture of claim 1 wherein the liquid crystal material is a cyanobiphenyl liquid crystal material and the electron rich alkene comprises a bicylic alkene which has as a result of its stereoelectronic configuration unequal π-electron density above and below the plane of the carbon-carbon double bond axis.

8. The polymerizable mixture of claim 7 wherein the multifunctional electron-rich alkene comprises a compound containing a plurality of norbornene functional groups.

9. The polymerizable mixture of claim 8 wherein the compound containing a plurality of norbornene functional groups is selected from the group consisting of norbornenecarboxylate esters of the formula:

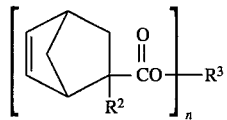

where n is an integer of 2 or more, $R^2$ is H or methyl and $R^3$ is the residue of a plural hydroxy compound.

10. The polymerizable mixture of claim 9 wherein said norbornenecarboxylate ester is an ester of 1,6-hexanediol, ethoxylated bisphenol A or polyethylene glycol.

11. The polymerizable mixture of claim 10 wherein the multifunctional electron-rich alkene is ethoxylated hisphenol A di(norbornene carboxylate) and the multifunctional thiol is pentaerythritol tetra-(3-mercaptopropionate).

12. The polymerizable mixture of claim 9 wherein the equivalent weight ratio of the norbornenecarboxylate ester to the multifunctional thiol range from about 0.7:1 to 1.3:1.

13. The polymerizable mixture of claim 12 wherein the equivalent weight ratio of the norbornenecarboxylate ester to the multifunctional thiol is about 1:1.

14. The polymerizable mixture of claim 8 wherein said liquid crystal amount is between about 30% and about 80% of said mixture.

15. The polymerizable composition of claim 14 wherein said liquid crystal amount is between about 40% and about 75% of said mixture.

* * * * *

UNITED STATES PATENT AND TRADEMARK OFFICE
CERTIFICATE OF CORRECTION

PATENT NO. : 5,516,455
DATED : May 14, 1996
INVENTOR(S) : Jacobine et al

It is certified that error appears in the above-indentified patent and that said Letters Patent is hereby corrected as shown below:

Col. 13, line 44, delete "vinyl oxymethyl cyclohexyl methyl" and insert -- vinyloxymethylcyclohexylmethyl --;

Col. 13, lines 63-64, delete "Aktienegesell schaft, Ludwi gshafen" and insert --Aktienegesellschaft, Ludwigshafen --;

Col. 13, line 65, delete "l i quid" and insert -- liquid --;

Col. 15, line 22, delete "Example 13}" and insert --(Example 13)--

Col. 16, line 20, delete "electron,rich" and insert -- electron-rich --;

Col. 16, lines 47-48, delete "hisphnol" and insert -- bisphenol --;

Col. 3, line 59, delete "nonbornenecarboxylate" and insert -- norbornenecarboxylate --.

Signed and Sealed this

Third Day of September, 1996

BRUCE LEHMAN

Attest:

*Attesting Officer*   *Commissioner of Patents and Trademarks*